United States Patent
Mohammadi

(10) Patent No.: US 11,009,095 B2
(45) Date of Patent: May 18, 2021

(54) DAMPER WITH MONOLITHIC BASE

(71) Applicant: Tenneco Automotive Operating Company Inc., Lake Forest, IL (US)

(72) Inventor: Amirahmad Mohammadi, Heverlee (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 56 days.

(21) Appl. No.: 16/181,726

(22) Filed: Nov. 6, 2018

(65) Prior Publication Data
US 2020/0141467 A1 May 7, 2020

(51) Int. Cl.
*F16F 9/32* (2006.01)
*F16F 9/54* (2006.01)
(Continued)

(52) U.S. Cl.
CPC ............ *F16F 9/3242* (2013.01); *B21D 22/28* (2013.01); *F16F 9/19* (2013.01); *F16F 9/54* (2013.01); *B60G 13/08* (2013.01); *B60G 2202/24* (2013.01); *B60G 2204/129* (2013.01); *B60G 2206/41* (2013.01); *B60G 2206/70* (2013.01); *B60G 2206/8104* (2013.01); *B60G 2206/82* (2013.01); *B60G 2206/83* (2013.01);
(Continued)

(58) Field of Classification Search
CPC .......... F16F 9/3242; F16F 9/54; F16F 9/3271; F16F 9/34; F16F 9/3405; F16F 9/19; B60G 2204/129; B60G 2206/70; B60G 2206/8102; B60G 2206/8104; B21D 22/28
See application file for complete search history.

(56) References Cited

U.S. PATENT DOCUMENTS 3,833,248 A * 9/1974 Wossner ................ B60R 19/32
293/134
4,541,265 A 9/1985 Dye et al.
(Continued)

FOREIGN PATENT DOCUMENTS

| CN | 104235255 A | 12/2014 |
|---|---|---|
| DE | 9208619 U1 | 9/1992 |

(Continued)

OTHER PUBLICATIONS

International Search Report and Written Opinion regarding PCT/US2019/059624, dated Feb. 25, 2020, 9 pages.

*Primary Examiner* — Thomas J Williams
*Assistant Examiner* — James K Hsiao
(74) *Attorney, Agent, or Firm* — Harness, Dickey & Pierce, P.L.C.

(57) ABSTRACT

A damper including a damper tube, a piston assembly, a piston rod attached to the piston assembly, and a monolithic base. The piston assembly is slidingly disposed within the damper tube. The monolithic base includes a closed end, an open end, a base portion at the closed end, and a wall portion. The base portion is joined to and seals one end of the damper tube. The base portion includes a concave depression that tapers inwardly from a base portion perimeter to a cup bottom. The wall portion extends longitudinally from the base portion perimeter to the open end such that the cup bottom is positioned between opposing sides of the wall portion. Integrally formed fastening eyes are provided in the opposing sides of the wall portion.

20 Claims, 7 Drawing Sheets

(51) Int. Cl.
  *B21D 22/28* (2006.01)
  *F16F 9/19* (2006.01)
  *B60G 13/08* (2006.01)
  *F16F 9/18* (2006.01)
(52) U.S. Cl.
  CPC ............. *F16F 9/185* (2013.01); *F16F 9/3257* (2013.01); *F16F 2224/0208* (2013.01); *F16F 2226/04* (2013.01)

(56) References Cited

U.S. PATENT DOCUMENTS

| | | | | |
|---|---|---|---|---|
| 4,791,712 A * | 12/1988 | Wells | ..................... | B21D 39/04 |
| | | | | 188/322.22 |
| 2003/0160372 A1 | 8/2003 | Klitsch et al. | | |
| 2005/0109570 A1 * | 5/2005 | Muller | ................... | F16F 9/3242 |
| | | | | 188/321.11 |
| 2006/0042895 A1 * | 3/2006 | Mangelschots | ....... | F16F 9/3242 |
| | | | | 188/322.19 |
| 2006/0198693 A1 * | 9/2006 | Handke | ..................... | F16F 9/54 |
| | | | | 403/230 |
| 2009/0194379 A1 * | 8/2009 | Maeda | .................. | F16F 9/3242 |
| | | | | 188/322.22 |
| 2013/0256070 A1 * | 10/2013 | Murakami | ............. | F16F 9/185 |
| | | | | 188/315 |
| 2014/0212683 A1 * | 7/2014 | Hartmann | .............. | B21D 22/26 |
| | | | | 428/603 |
| 2014/0345793 A1 * | 11/2014 | Micarelli | ................ | B29C 43/10 |
| | | | | 156/229 |
| 2015/0292588 A1 * | 10/2015 | Scharf | ..................... | F16F 1/373 |
| | | | | 428/137 |
| 2015/0377315 A1 * | 12/2015 | Gunther | ................. | B21D 53/88 |
| | | | | 188/322.19 |
| 2016/0146285 A1 * | 5/2016 | Wilkin | .................... | F16F 9/185 |
| | | | | 188/322.19 |
| 2016/0201751 A1 * | 7/2016 | Reybrouck | ............ | B60G 13/08 |
| | | | | 188/298 |
| 2017/0074343 A1 * | 3/2017 | Dreher | .................. | F16F 9/3235 |
| 2017/0175840 A1 * | 6/2017 | Rolleke | ................. | F16F 9/3242 |
| 2017/0292579 A1 * | 10/2017 | Takeo | ........................ | F16F 9/56 |
| 2019/0032742 A1 * | 1/2019 | Fritz | ........................ | F16F 9/064 |
| 2019/0390730 A1 * | 12/2019 | Russell | ................... | F16F 9/065 |

FOREIGN PATENT DOCUMENTS

| | | |
|---|---|---|
| DE | 9319202 U1 | 2/1994 |
| DE | 19750414 A1 | 9/1998 |
| DE | 202006002486 U1 | 6/2007 |
| DE | 102008032659 A1 | 1/2010 |
| DE | 102011087597 A1 | 6/2013 |
| DE | 202013104845 U1 | 2/2014 |
| DE | 102015200888 A1 | 5/2016 |
| KR | 20120029835 A | 3/2012 |
| KR | 20160091144 A | 8/2016 |
| WO | WO-2015117787 A1 | 8/2015 |

* cited by examiner

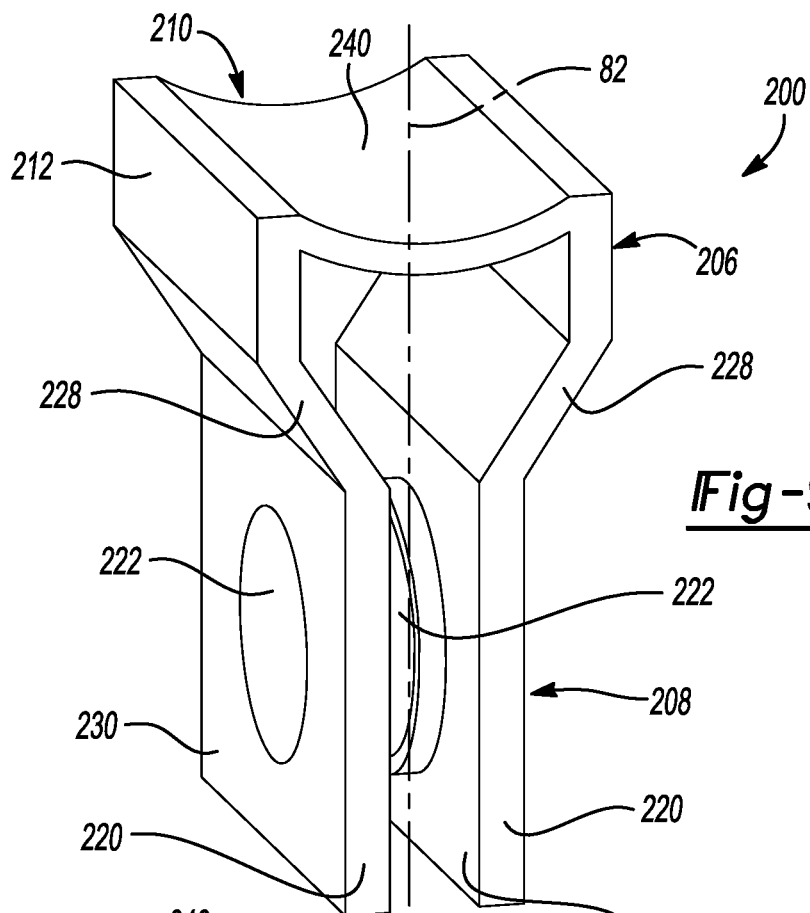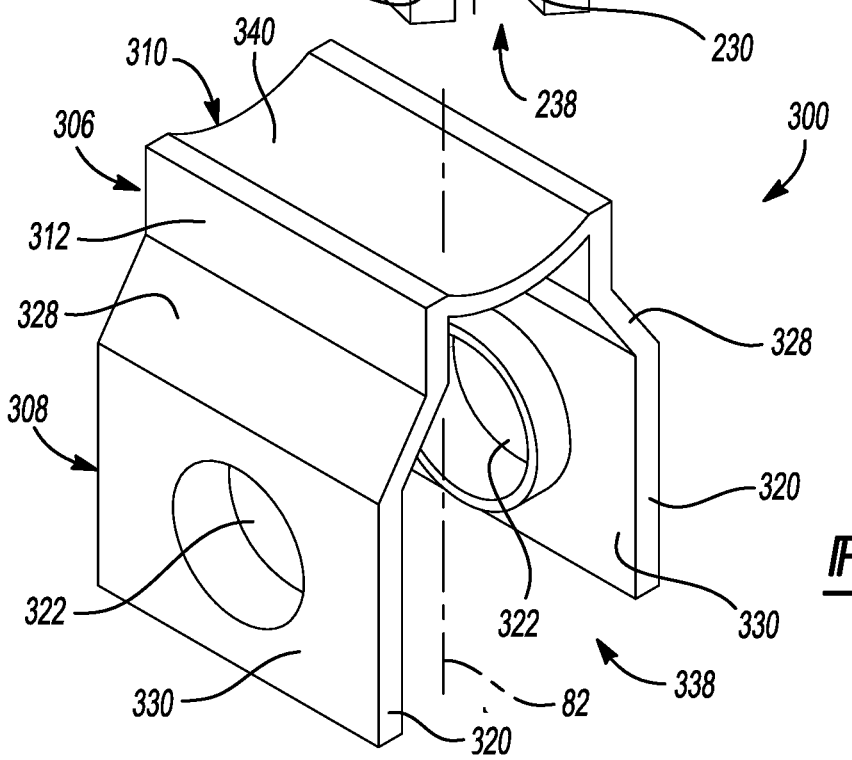

DAMPER WITH MONOLITHIC BASE

FIELD

The present disclosure relates generally to dampers and to manufacturing processes for creating dampers. More particularly, the subject disclosure relates to structures and processes for closing an end of a damper tube and providing an attachment loop on the closed end.

BACKGROUND

The statements in this section merely provide background information related to the present disclosure and may not constitute prior art.

In general, dampers are installed alongside a spring (as a stand-alone shock absorber) or inside a spring (as part of a coil-over shock and strut assembly) and placed in front and rear suspension systems. They are used to absorb and dissipate the impact and rebound movement of a vehicle's suspension system, and keep the vehicle's tires in contact with the ground. The shock absorber is installed to the vehicle frame by an upper mount and to the suspension by a lower mount with a loop or U-bracket.

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system, typically incorporated within the piston, functions to create a damping load during the shock absorber's extension stroke. A second valving system, typically incorporated within the piston in a mono-tube shock absorber and in a base valve assembly in a dual-tube shock absorber, functions to create a damping load during the shock absorber's compression stroke.

The lower mount or base assembly of a standard shock absorber typically includes an outer tube, a base plate/cup, and a loop. The primary role of the base plate/cup is to close the pressure tube/gas chamber in a mono-tube shock absorber and to close the pressure tube/reserve tube in a dual-tube shock absorber and support the base valve assembly. Typically, the base plate (or hot closed bottom of the tube) is welded to the loop (closed or split), which connects the bottom end of the shock absorber to a suspension component of the vehicle. The loop has to be made in a separate manufacturing operation from a bar or tube (closed type) or a strip or sheet of metal (split type).

SUMMARY

This section provides a general summary of the disclosure, and is not a comprehensive disclosure of its full scope or all of its features.

In accordance with one aspect of the present disclosure, a damper including a damper tube, a piston assembly, a piston rod, and a monolithic base is provided. The damper tube extends along a longitudinal axis between a first end and a second end. The piston assembly is slidingly disposed within the damper tube. The piston rod extends along the longitudinal axis between a proximal end that is attached to the piston assembly and a distal end that extends outwardly from the first end of the damper tube. The monolithic base is positioned at the second end of the damper tube. The monolithic base includes a closed end, an open end, a base portion at the closed end, and a wall portion extending longitudinally between the closed end and the open end. The base portion of the monolithic base is joined to and seals the second end of the damper tube. The base portion includes a concave depression that tapers inwardly from a base portion perimeter to a cup bottom. The concave depression extends in a first longitudinal direction relative to the base portion perimeter to define a depth of the concave depression. The wall portion extends in the first longitudinal direction from the base portion perimeter to the open end such that the cup bottom is positioned between opposing sides of the wall portion. The monolithic base further includes a pair of integrally formed fastening eyes in the opposing sides of the wall portion.

In accordance with another aspect of the present disclosure, a method of manufacturing the damper described above is disclosed. The method includes the step of deep drawing a flat sheet metal blank into a tube to form a monolithic base having a base portion defined by a closed end of the tube, an open end opposite the closed end of the tube, and a wall portion of tubular shape that extends longitudinally from the base portion to the open end. The method also includes the step of deforming the base portion of the monolithic base to create a concave depression that tapers inwardly from a base portion perimeter to a cup bottom such that the cup bottom is positioned between opposing sides of the wall portion. The method further includes the step of partially flattening the opposing sides of the wall portion to create flat areas on the opposing side of the wall portion and a sloped region positioned longitudinally between the base portion perimeter and the flat areas. The method proceeds with the steps of punching a pair of integrally formed fastening eyes into the flat areas on the opposing sides of the wall portion to create an attachment loop and attaching the base portion of the monolithic base to one end of a damper tube to close that end of the damper tube.

The design of the monolithic base disclosed herein reduces the number of parts and the number of interfaces between parts in the base assembly of the damper, which brings simplicity to the design and overcomes disadvantages associated with multiple part manufacturing and joining process. This also eliminates possible structural stresses induced during welding, which can adversely affect fatigue performance of the damper at the connection of the attachment loop and base assembly. In addition, corrosion of weld joints can be avoided, using a coated single piece sheet metal component.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 9 is a side perspective view of another exemplary monolithic base for a damper;

FIG. 10 is a side perspective view of another exemplary monolithic base for a damper.

DETAILED DESCRIPTION

Figure 1:
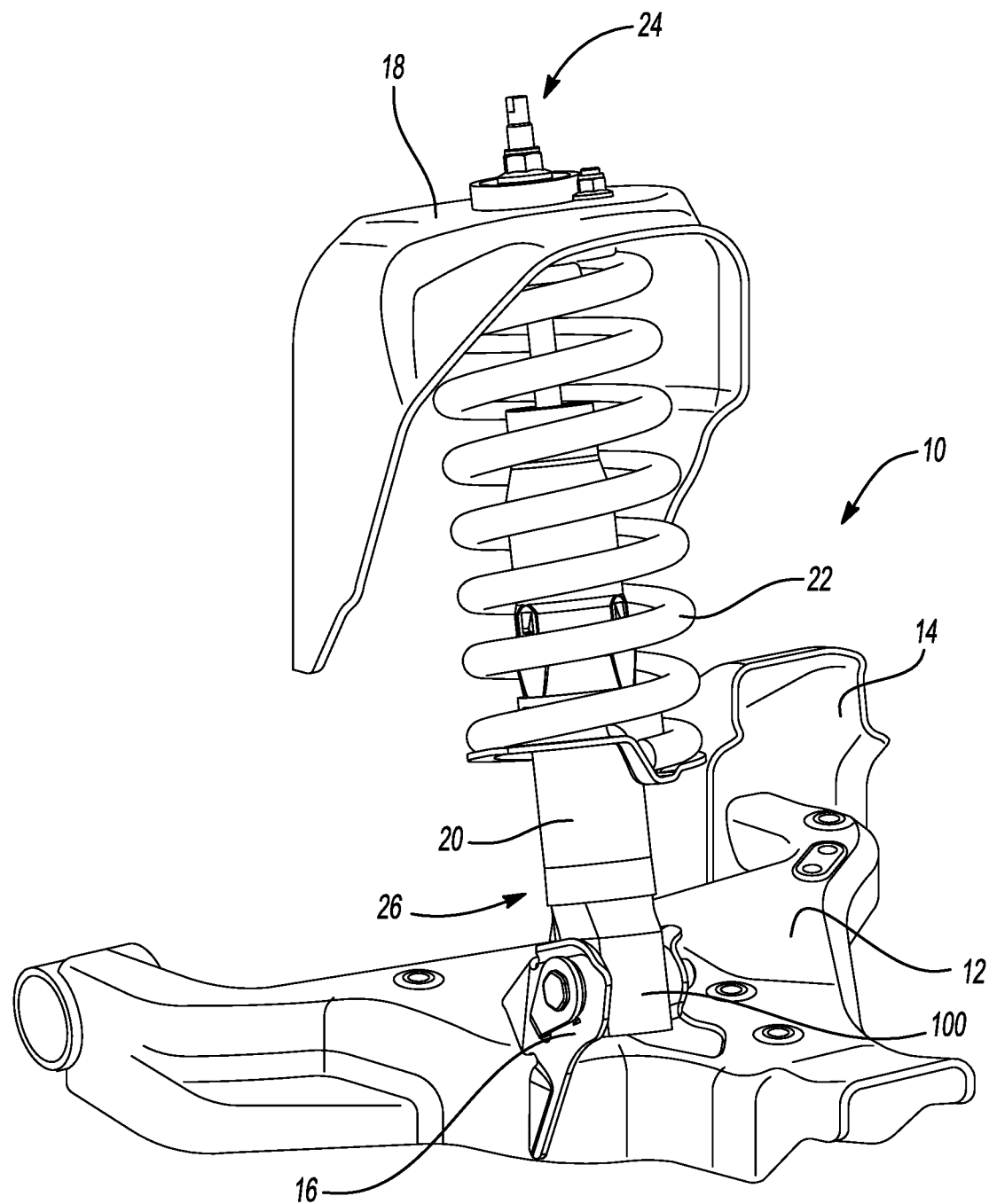
FIG. 1 is a side perspective view of an exemplary vehicle suspension system, which includes an exemplary damper constructed in accordance with the present disclosure.

Referring to the Figures, wherein like numerals indicate corresponding parts throughout the several views, a damper 20 constructed in accordance with the present disclosure is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle suspension system 10. The vehicle suspension system 10 includes a suspension swing arm 12 that is pivotally connected to a vehicle frame member 14 and includes a lower damper mount 16, an upper damper mount 18 that is fixed to the body of the vehicle (not shown), a damper 20 connected to and extending between the lower and upper damper mounts 16, 18, and a coil spring 22 positioned co-axially about the damper 20. The suspension swing arm 12 includes or is mounted to a transversely extending axle assembly (not shown) that is adapted to operatively support a wheel of the vehicle (not shown). The spring 22 supports the weight of the vehicle while enabling the suspension swing arm 12 and thus the wheel to move up and down relative to the vehicle frame member 14 and the upper damper mount 18 due to bumps or other undulations in the road surface. The damper 20 operates to dampen these movements of the suspension swing arm 12 for improved ride and vehicle control.

The damper 20 extends longitudinally between a rod-side end 24 and an opposite end 26. In the illustrated example, the rod-side end 24 is connected to the upper damper mount 18. The damper 20 includes a monolithic base 100 at end 26, which is connected to the lower damper mount 16 on the suspension swing arm 12. Although other fastening mechanism are possible, a bolted connection between the monolithic base 100 and the lower damper mount 16 is illustrated in FIG. 1. It should also be appreciated that the damper 20 may be connected in a reverse orientation, where the rod-side end 24 is connected to the lower damper mount 16 and the monolithic base 100 is connected to the upper damper mount 18.

In the illustrated example, the damper 20 and the spring 22 are configured in a coil-over arrangement and the vehicle suspension system 10 is configured as an independent suspension system. It should be appreciated that this is merely to illustrate one potential application for the damper 20 of the present disclosure and that the damper 20 disclosed herein can be used in other applications, such as in vehicles incorporating other suspension systems known in the art where the damper 20 and the spring 22 may or may not be arranged in a coil-over arrangement. Further, the term "damper" as used herein is meant to refer to shock absorbers in general and thus will include McPherson struts and other damper designs known in the art.

Figure 2:
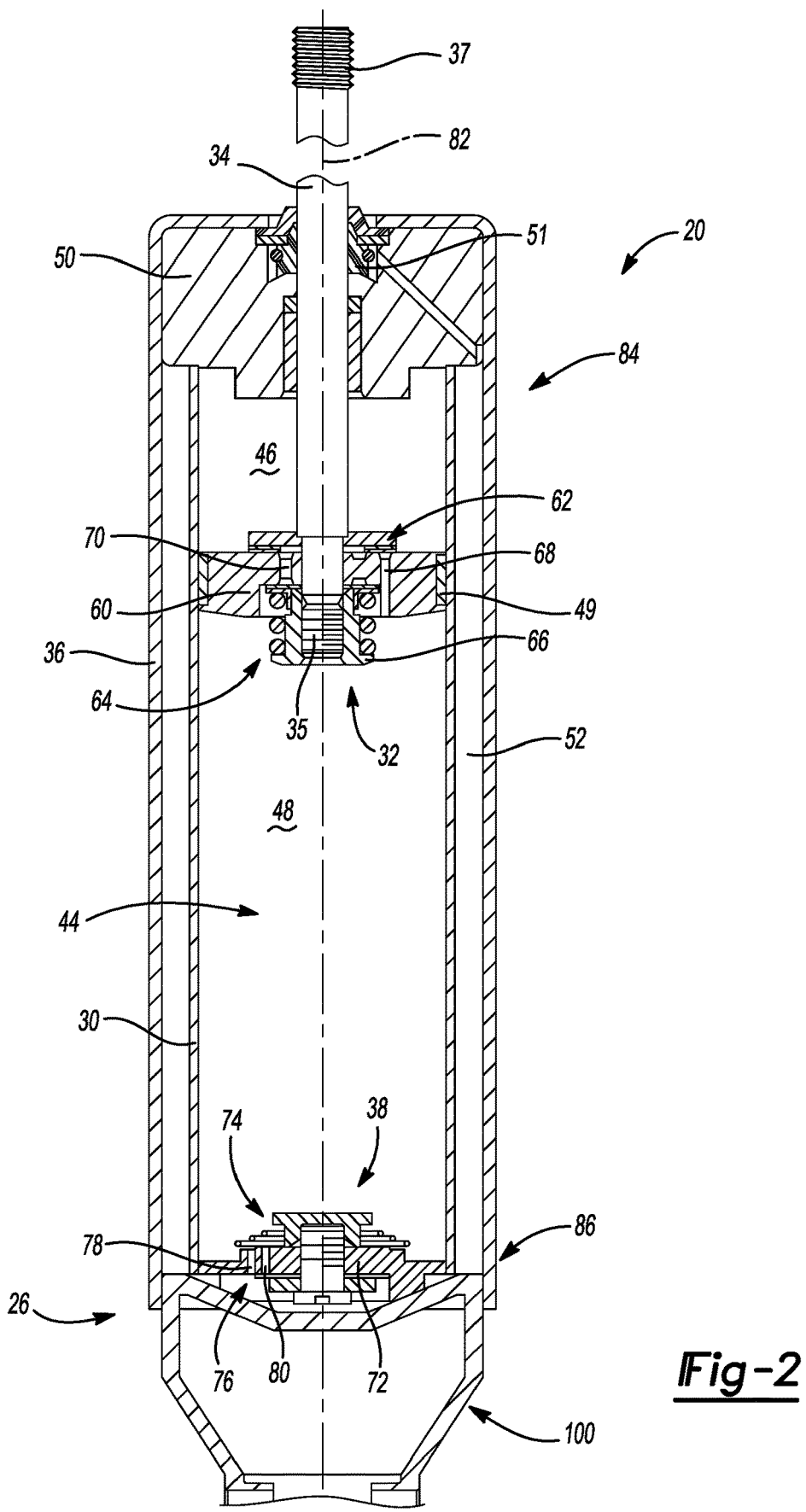
FIG. 2 is a side cross-sectional view of the exemplary damper shown in FIG. 1.
Figure 3:
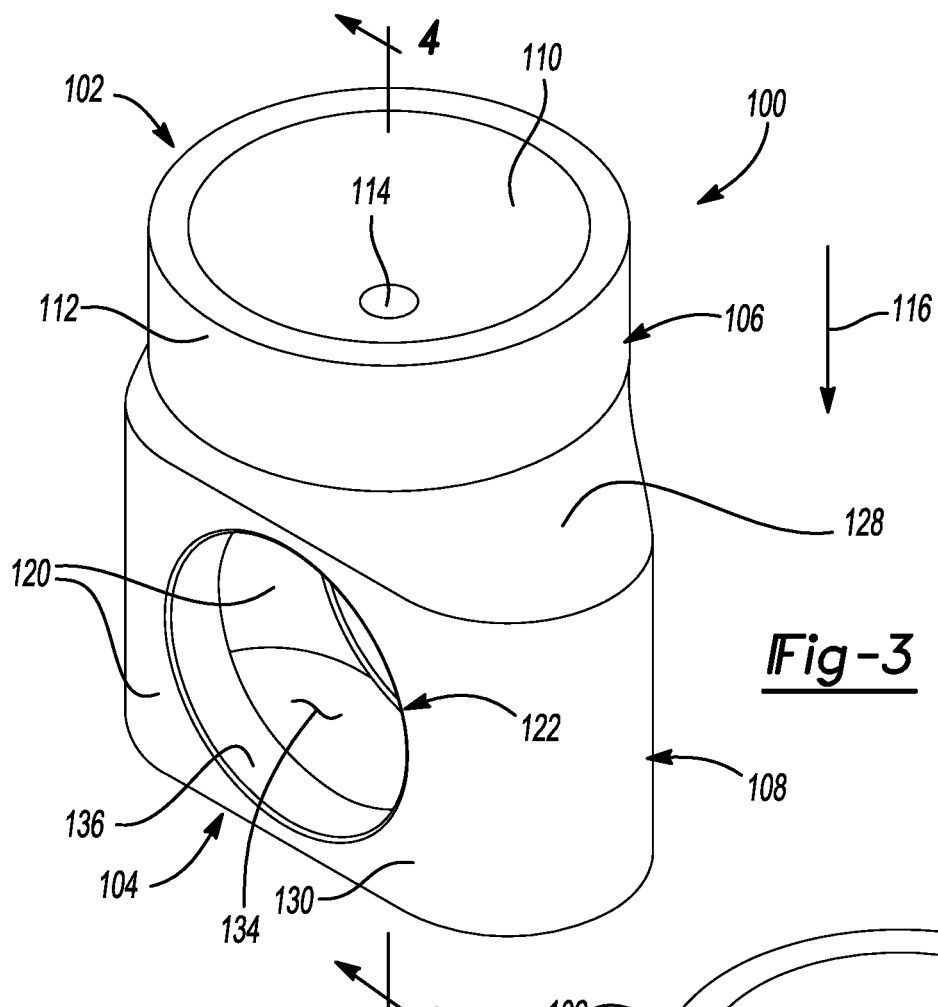
FIG. 3 is a side perspective view of an exemplary monolithic base for the damper shown in FIG. 1.
Figure 4:
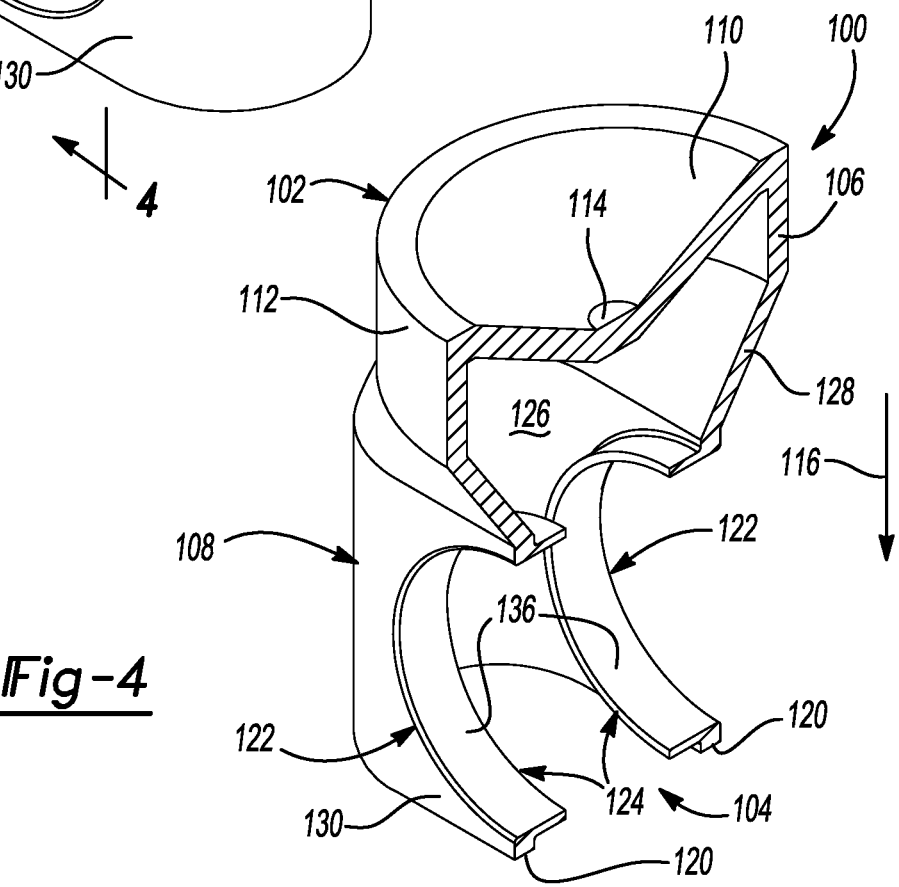
FIG. 4 is a perspective section view of the exemplary monolithic base shown in FIG. 3.
Figure 5:
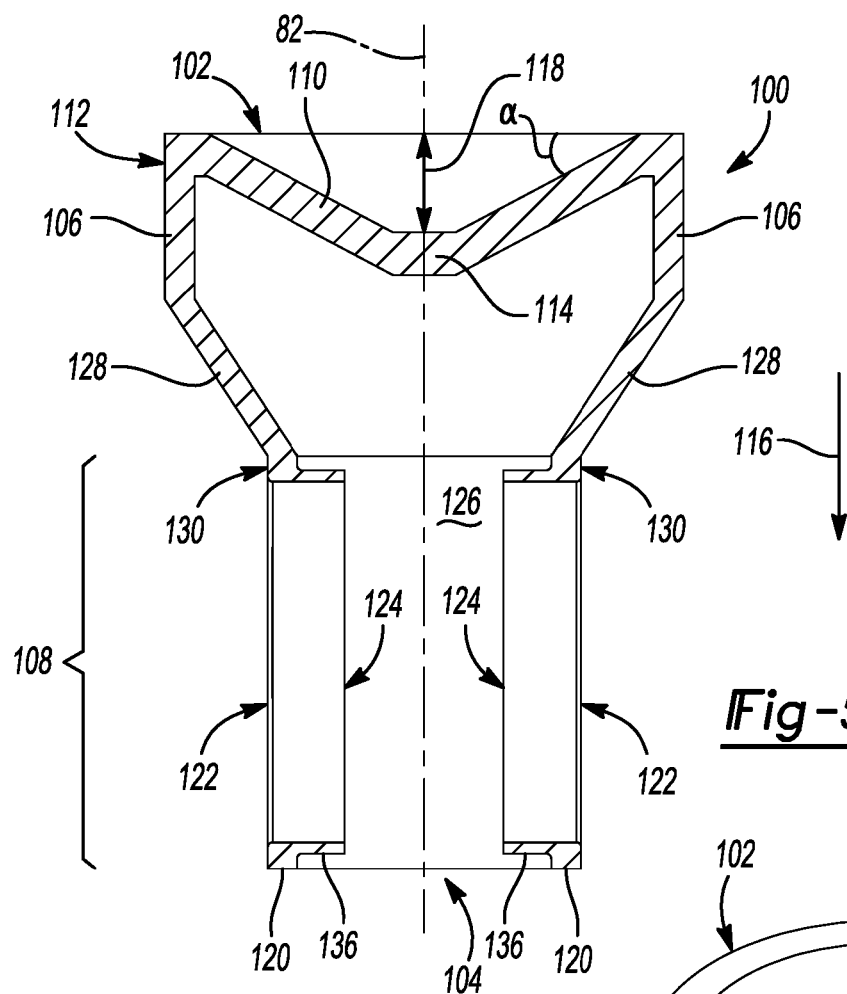
FIG. 5 is a side cross-sectional view of the exemplary monolithic base shown in FIG. 3.
Figure 6:
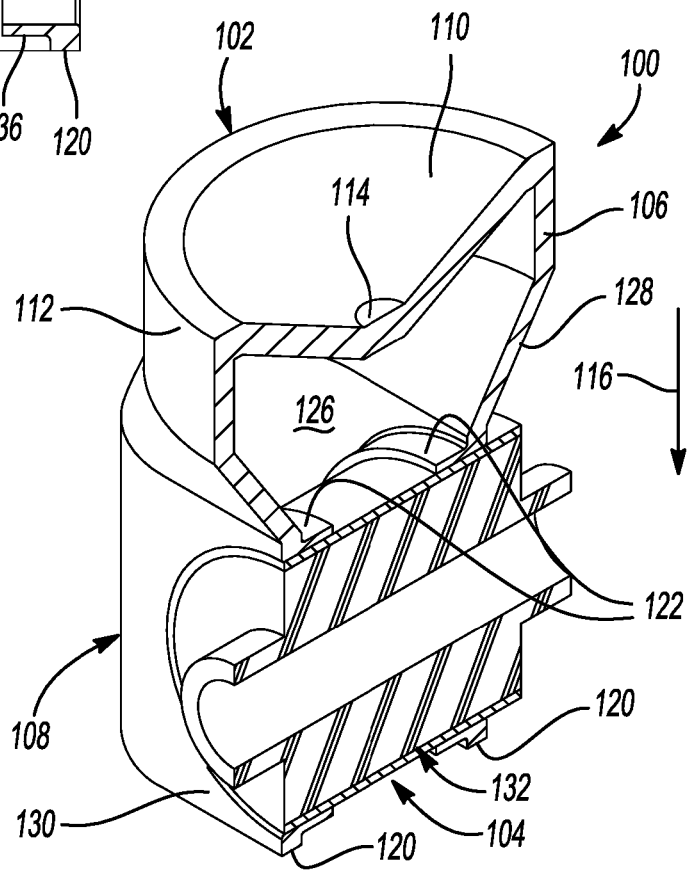
FIG. 6 is perspective section view of the exemplary monolithic base shown in FIG. 3 with an exemplary bushing assembly installed.

In FIG. 2, the damper 20 illustrated in FIG. 1 is shown in greater detail. Damper 20 includes a pressure tube 30, a piston assembly 32, a piston rod 34, and optionally, a reserve tube 36 and a base valve assembly 38. The pressure tube 30 defines a working chamber 44. The piston assembly 32 is slidably disposed within pressure tube 30 and divides working chamber 44 into an upper working chamber 46 and a lower working chamber 48. A seal 49 is disposed between piston assembly 32 and pressure tube 30 to permit sliding movement of piston assembly 32 with respect to pressure tube 30 without generating undue frictional forces as well as sealing the upper working chamber 46 from the lower working chamber 48. The piston rod 34 extends between a proximal end 35 and a distal end 37. The proximal end 35 of the piston rod 34 is attached to the piston assembly 32. The piston rod 34 extends through the upper working chamber 46 and through a rod guide assembly 50. Accordingly, the distal end 37 of the piston rod 34 is always positioned outside the pressure tube 30 at the rod-side end 24 of the damper 20. A seal assembly 51 seals the interface between the rod guide assembly 50 and the piston rod 34.

The distal end 37 of piston rod 34 opposite to piston assembly 32 is adapted to be secured to the upper damper mount 18 of the vehicle suspension system 10. Because piston rod 34 extends only through the upper working chamber 46 and not the lower working chamber 48, extension and compression movements of the piston assembly 32 with respect to the pressure tube 30 causes a difference in the amount of fluid displaced in the upper working chamber 46 compared to the amount of fluid displaced in the lower working chamber 48. The difference in the amount of fluid displaced is known as the "rod volume" and during extension movements it flows through the base valve assembly 38. During a compression movement of the piston assembly 32 with respect to pressure tube 30, valving within the piston assembly 32 allows fluid to flow from the lower working chamber 48 to the upper working chamber 46 while the "rod volume" of fluid flow flows through the base valve assembly 38.

The base valve assembly 38 is positioned at end 26 of the damper 20 and controls the flow of fluid between the lower working chamber 48 and a reserve chamber 52 positioned radially between the pressure tube 30 and the reserve tube 36. When damper 20 extends in length, an additional volume of fluid is needed in the lower working chamber 48 due to the rod volume and fluid will flow from the reserve chamber 52 to the lower working chamber 48 through base valve assembly 38. When damper 20 compresses in length, an excess of fluid must be removed from the lower working chamber 48 due to the rod volume. Thus, fluid will flow from the lower working chamber 48 to the reserve chamber 52 through base valve assembly 38.

Piston assembly 32 comprises a piston body 60, a first compression valve assembly 62, and a first extension valve assembly 64. A nut 66 is threaded onto the piston rod 34 to secure the first compression valve assembly 62, the piston body 60, and the first extension valve assembly 64 to the piston rod 34. Piston body 60 defines a first plurality of compression passages 68 and a first plurality of extension passages 70. Base valve assembly 38 comprises a valve body 72, a second extension valve assembly 74, and a second compression valve assembly 76. Valve body 72 defines a second plurality of extension passages 78 and a second plurality of compression passages 80.

During a compression stroke, fluid in the lower working chamber 48 is pressurized causing fluid pressure to react against the first compression valve assembly 62. The first compression valve assembly 62 therefore acts as a check valve between the lower working chamber 48 and the upper working chamber 46. The damping characteristics of the damper 20 during a compression stroke can also be controlled by the base valve assembly 38. The second compression valve assembly 76 controls the flow of fluid from the lower working chamber 48 to the reserve chamber 52 during a compression stroke. The second compression valve assembly 76 can be designed as a safety hydraulic relief valve, a damping valve, or the second compression valve assembly 76 can be removed altogether from base valve assembly 38.

During an extension stroke, the first plurality of compression passages 68 are closed by the first compression valve assembly 62 and fluid in the upper working chamber 46 is pressurized causing fluid pressure to react against the first extension valve assembly 64. The first extension valve assembly 64 is designed as either a safety hydraulic relief valve, which will open when the fluid pressure within the upper working chamber 46 exceeds a predetermined limit, or as a pressure valve working to change the shape of the damping curve. The damping characteristics of the damper 20 during an extension stroke can be controlled by the first extension valve assembly 64. Replacement flow of fluid into the lower working chamber 48 during an extension stroke flows through the base valve assembly 38. Fluid in the lower working chamber 48 is reduced in pressure causing fluid in the reserve chamber 52 to flow to the lower working chamber 48 through the second plurality of extension passages 78. The second extension valve assembly 74 therefore acts as a check valve between the reserve chamber 52 and the lower working chamber 48. The damping characteristics of the damper 20 during an extension stroke can be controlled by the first extension valve assembly 64.

Although a dual-tube damper 20 is illustrated in FIG. 2, it should be appreciated that the subject disclosure is equally applicable to mono-tube dampers. Such mono-tube dampers lack the reserve tube 36 and base valve assembly 38 shown in FIG. 2. As a result, the term "damper tube" as used herein is intended to encompass a pressure tube 30 and/or a reserve tube 36. Regardless of the configuration, the monolithic base 100 is positioned at and closes end 26 of the damper 20.

The pressure tube 30 has a cylindrical shape and extends about a longitudinal axis 82 between a first end 84 and a second end 86. The first end 84 of the pressure tube 30 mates with the rod guide assembly 50. The base valve assembly 38 is press-fit into the second end 86 of the pressure tube 30. The monolithic base 100 is positioned at the second end 86 of the pressure tube 30.

With reference to FIGS. 3-6, the monolithic base 100 includes a closed end 102, an open end 104, a base portion 106 at the closed end 102, and a wall portion 108 extending longitudinally between the closed end 102 and the open end 104. The base portion 106 of the monolithic base 100 is joined to and seals the second end 86 of the pressure tube 30 and/or the reserve tube 36. The base portion 106 includes a concave depression 110 that tapers inwardly from a base portion perimeter 112 to a cup bottom 114. The concave depression 110 extends in a first longitudinal direction 116 relative to the base portion perimeter 112 to define a depth 118 of the concave depression 110. The wall portion 108 extends in the first longitudinal direction 116 from the base portion perimeter 112 to the open end 104 such that the cup bottom 114 is positioned between opposing sides 120 of the wall portion 108.

The monolithic base 100 further includes a pair of integrally formed fastening eyes 122 in the opposing sides 120 of the wall portion 108. The integrally formed fastening eyes 122 have a cylindrical shape and extend inwardly from the opposing sides 120 of the wall portion 108 to internal ends 124. The internal ends 124 of the pair of integrally formed fastening eyes 122 are laterally spaced apart from one another. As a result, the monolithic base 100 includes an uninterrupted cavity 126 that is positioned laterally between the opposing sides 120 of the wall portion 108. The uninterrupted cavity 126 extends longitudinally between the base portion 106 and the open end 104 and passes between the laterally spaced apart internal ends 124 of the pair of integrally formed fastening eyes 122.

The wall portion 108 of the monolithic base 100 has a tubular shape that extends from the base portion perimeter 112 to the open end 104. The wall portion 108 of the monolithic base 100 optionally includes a sloped region 128 that is positioned longitudinally between the base portion perimeter 112 and the pair of integrally formed fastening eyes 122. In the illustrated example, the sloped region 128 of the wall portion 108 of the monolithic base 100 tapers radially inwardly toward the longitudinal axis 82. Alternatively, the sloped region 128 could expand radially outwardly away from the longitudinal axis 82. The opposing sides 120 of the wall portion 108 include flat areas 130 that are adjacent to and surround the pair of integrally formed fastening eyes 122. Although other configurations are possible, in the embodiment illustrated in FIGS. 3-6, the flat areas 130 of the opposing sides 120 of the wall portion 108 are substantially parallel to one another.

A bushing assembly 132 is positioned in and is supported by the pair of integrally formed fastening eyes 122. The bushing assembly 132 extends through the uninterrupted cavity 126 in the wall portion 108 and between the laterally spaced, integrally formed, fastening eyes 122. This creates an attachment loop 134 at end 26 of the damper 20. Depending on the requirements of the bushing assembly 132, the fastening eyes 122 can include integrally formed flanges 136.

The concave depression 110 in the base portion 106 has a frustoconical shape that is configured to support the base valve assembly positioned in the second end 86 of the pressure tube 30. Notches (not shown) can be included in the concave depression 110 to support the base valve assembly 38. The angle α of the base portion 106 in the concave depression 110 can be adjusted based on the application and design of the base valve assembly 38. Similarly, the diameter of the base portion 106 of the monolithic base 100 can be adjusted based on the diameter of the pressure tube 30. To create enough room in the flat areas 130 of the wall portion 108 to flange fastening eyes 122 with a large diameter, the diameter of the base portion 106 can also be increased accordingly. The diameter of the base portion 106 and the size of the flat areas 130 of the wall portion 108 are parameters that are correlated with and may be adjusted according to each other based on application specific requirements and constraints, such as the loop size and the width of the upper and/or lower damper mounts 16, 18 of the vehicle suspension system 10. The length of the sheet metal blank forming the monolithic base 100 also has to be defined based on the requirements for total length of the damper 20.

Depending on application specific requirements, the fastening eyes 122 in the wall portion 108 of the monolithic base 100 can be flanged or not flanged. The thickness of the flanges 136 can be defined based on the extrusion height and hole diameter of the fastening eyes 122. This is done based on the constancy-of-volume rule (material volume is not changing due to plastic deformation). The thickness and yield strength of the initial blank is selected based on the requirements for damping loads. Depending on the diameter of the cylindrical sheet metal blank, the pressure tube 30 and/or reserve tube 36 can be necked or expanded.

Figure 7:
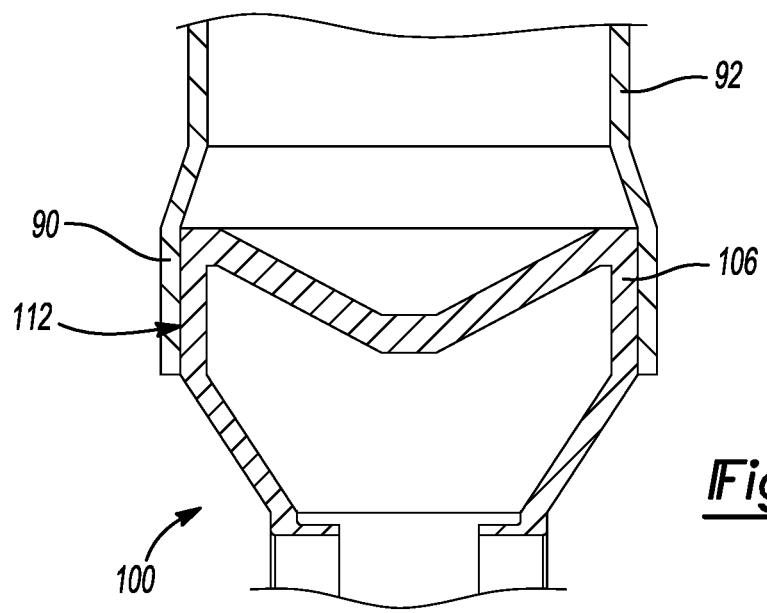
FIG. 7 is a side cross-sectional view of an exemplary mounting arrangement for the monolithic base shown in FIG. 3.
Figure 8:
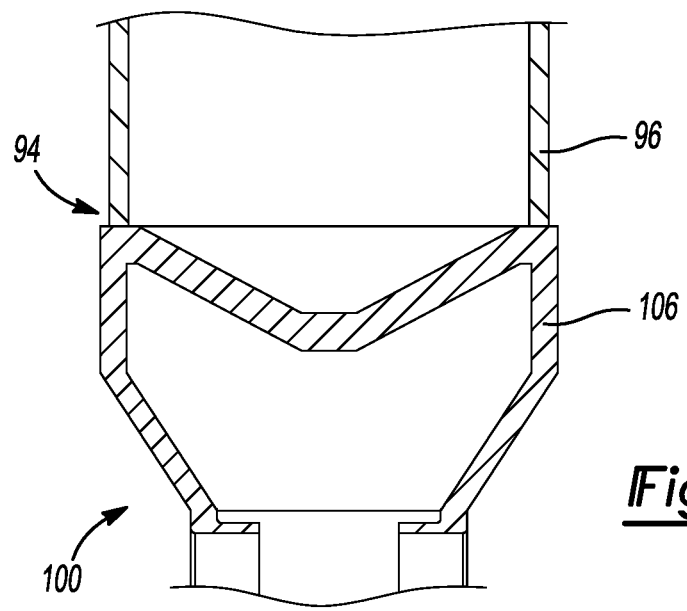
FIG. 8 is a side cross-sectional view of another exemplary mounting arrangement for the monolithic base shown in FIG. 3.

The base portion perimeter 112 has a circular shape. The pressure tube 30 and/or the reserve tube 36 has a cylindrical shape with a circular opening at the second end 86 that mates with the base portion 106 of the monolithic base 100. The base portion 106 of the monolithic base 100 may be attached to the pressure tube 30 and/or the reserve tube 36 in a number of different ways, including without limitation, by welding. For example, the monolithic base 100 may be fixed to the pressure tube 30 and/or reserve tube 36 by resistive welding or can be welded at the base portion perimeter 112 to the pressure tube 30 or the reserve tube 36 by arc welding. As shown in FIG. 7, the base portion perimeter 112 of the base portion 106 of the monolithic base 100 may be received in a flared end 90 of damper tube 92 in an overlapping relationship. Alternatively, as shown in FIG. 8, the base portion 106 of the monolithic base 100 may directly abut an opened end 94 of damper tube 96.

The base portion 106 of the monolithic base 100 can have different geometries such as rectangular or oval. The shape of the base portion 106 of monolithic base 100 can be defined and adjusted based on the shape of the end 26 of the damper 20. For instance, a partially flattened tube end with a rectangular opening can be closed with one of the U-shaped monolithic bases 200, 300 shown in FIGS. 9 and 10. These monolithic bases 200, 300 are manufactured from sheet metal and include rectangular base portions 206, 306. In accordance with these embodiments, the monolithic bases 200, 300 include wall portions 208, 308 with opposing sides 220, 320 that form a clevis 238, 338. Each of the opposing sides 220, 320 of the monolithic bases 200, 300 has a sloped region 228, 328 positioned longitudinally between a base portion perimeter 212, 312 and a pair of integrally formed fastening eyes 222, 322. The sloped regions 228, 328 may be angled either inwardly towards the longitudinal axis 82 (FIG. 9) or outwardly away from the longitudinal axis 82 (FIG. 10). The opposing sides 220, 320 have flat areas 230, 330 adjacent to and surround the pair of integrally formed fastening eyes 222, 322. Concave depressions 210, 310 in the base portions 206, 306 are formed by U-shaped troughs 240, 340 that are configured to support the base valve assembly 38 positioned in the second end 86 of the pressure tube 30. The base portion perimeters 212, 312 have a rectangular shape and the pressure tube 30 has a cylindrical shape that transitions to a non-circular opening at the second end 86 that mates with the base portions 206, 306 of the monolithic bases 200, 300. A hole-flanging operation can be performed (by stamping or sheet metal bending) to create the fastening eyes 222, 322 in the wall portions 208, 308. Similar to the cylindrical base portion 106 of monolithic base 100, the size of the base portions 206, 306 of monolithic bases 200, 300 can be reduced or expanded based on application specific requirements.

Figure 11:
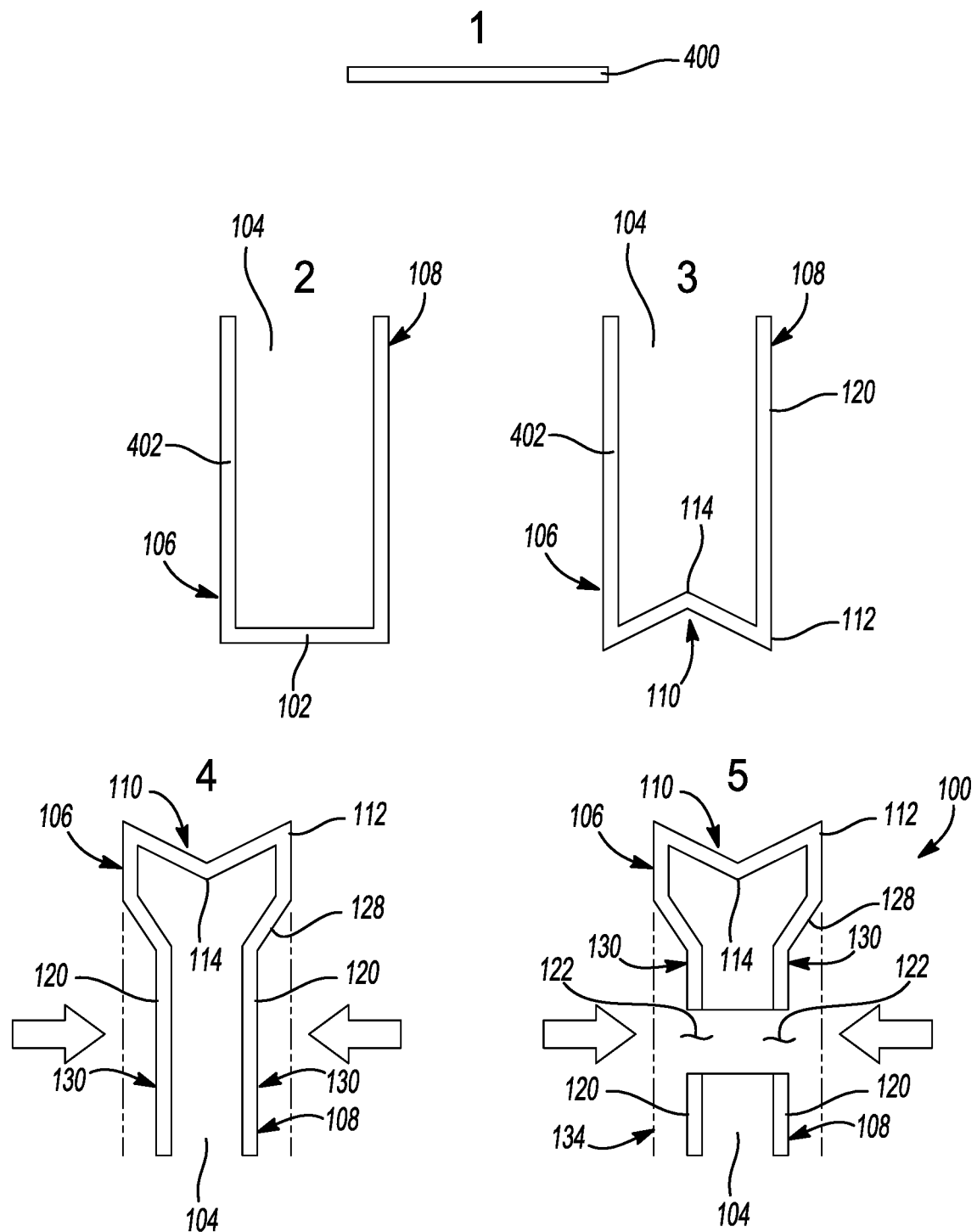
FIG. 11 is an exemplary process flow for a method of manufacturing a monolithic base for a damper.

With reference to FIG. 11, a method of manufacturing the damper 20 is illustrated. The method includes step 1-2 of deep drawing a flat sheet metal blank 400 into a tube 402 to form a monolithic base 100 having a base portion 106 defined by a closed end 102 of the tube 402, an open end 104 opposite the closed end 102 of the tube 402, and a wall portion 108 of tubular shape that extends longitudinally from the base portion 106 to the open end 104. The method also includes step 2-3 of deforming the base portion 106 of the monolithic base 100 to create a concave depression 110 that tapers inwardly from a base portion perimeter 112 to a cup bottom 114 such that the cup bottom 114 is positioned between opposing sides 120 of the wall portion 108. The method further includes step 3-4 of partially flattening the opposing sides 120 of the wall portion 108 to create flat areas 130 on the opposing sides 120 of the wall portion 108 and a sloped region 128, positioned longitudinally between the base portion perimeter 112 and the flat areas 130. The method proceeds with step 4-5 of punching a pair of integrally formed fastening eyes 122 into the flat areas 130 on the opposing sides 120 of the wall portion 108 to create an attachment loop 134 and a final step (not illustrated) of attaching the base portion 106 of the monolithic base 100 to one end of a pressure tube 30 and/or a reserve tube 36 to close the end(s) of the pressure tube 30 and/or reserve tube 36.

It should be appreciated that the cylindrical shape of the monolithic base 100, which includes one closed end 102 and one open end 104, can be manufactured from a ferrous or non-ferrous flat sheet metal blank 400 by sheet metal forming processes such as deep drawing, spinning, bending, rolling, incremental forming, or stamping and welding shells. The other features of the monolithic base 100 can be manufactured either during the cup forming process or after the cup forming process. For example, a partial flattening (or partial expansion) of the cylindrical shape of the monolithic base 100 can be performed by applying transversal loads either during or after the cup forming process. Similarly, the process of punching and extruding the fastening eyes 122 (hole-flanging) can take place during or after the cup forming process.

Many modifications and variations of the present disclosure are possible in light of the above teachings and may be practiced otherwise than as specifically described while within the scope of the appended claims. The steps of the method set forth herein may be practiced sequentially, in parallel, or in an order that is different from the order in which they are listed herein.

What is claimed is:

1. A damper comprising:
  a damper tube extending along a longitudinal axis between a first end and an open second end;
  a piston assembly disposed within and slidably engaging said damper tube;
  a piston rod extending along said longitudinal axis between a proximal end that is attached to said piston assembly and a distal end that extends outwardly from said first end of said damper tube;
  a monolithic base positioned at said second end of said damper tube, said monolithic base including a closed end, an open end, a base portion at said closed end, and a wall portion extending longitudinally between said closed end and said open end;
  said base portion of said monolithic base being joined to and sealing said second end of said damper tube;
  said base portion including a concave depression that tapers inwardly from a base portion perimeter to a cup bottom;
  said concave depression extending in a first longitudinal direction relative to said base portion perimeter to define a depth of said concave depression; and
  said wall portion extending in said first longitudinal direction from said base portion perimeter to said open end such that said cup bottom is positioned between opposing sides of said wall portion.

2. The damper as set forth in claim 1, wherein said monolithic base includes a pair of integrally formed fastening eyes in said opposing sides of said wall portion, said pair of integrally formed fastening eyes having a cylindrical shape and extending inwardly from said opposing sides of said wall portion to internal ends.

3. The damper as set forth in claim 2, wherein said internal ends of said pair of integrally formed fastening eyes are laterally spaced apart from one another.

4. The damper as set forth in claim 3, wherein said monolithic base includes an uninterrupted cavity, positioned laterally between said opposing sides of said wall portion, that extends longitudinally between said base portion and said open end.

5. The damper as set forth in claim 1, wherein said monolithic base includes a pair of integrally formed fastening eyes in said opposing sides of said wall portion and wherein said wall portion of said monolithic base has a tubular shape that extends from said base portion perimeter to said open end.

6. The damper as set forth in claim 5, wherein said wall portion of said monolithic base includes a sloped region, positioned longitudinally between said base portion perimeter and said pair of integrally formed fastening eyes, that tapers radially inwardly.

7. The damper as set forth in claim 5, wherein said opposing sides of said wall portion include flat areas adjacent to and surround said pair of integrally formed fastening eyes.

8. The damper as set forth in claim 5, wherein said concave depression in said base portion has a frustoconical shape that is configured to support a base valve assembly positioned in said second end of said damper tube.

9. The damper as set forth in claim 5, wherein said base portion perimeter has a circular shape and wherein said damper tube has a cylindrical shape with a circular opening at said second end that mates with said base portion of said monolithic base.

10. The damper as set forth in claim 1, wherein said monolithic base includes a pair of integrally formed fastening eyes in said opposing sides of said wall portion with said opposing sides of said wall portion of said monolithic base forming a clevis.

11. The damper as set forth in claim 10, wherein each of said opposing sides of said wall portion of said monolithic base has a sloped region positioned longitudinally between said base portion perimeter and said pair of integrally formed fastening eyes.

12. The damper as set forth in claim 11, wherein said opposing sides of said wall portion include flat areas adjacent to and surrounding said pair of integrally formed fastening eyes.

13. The damper as set forth in claim 10, wherein said concave depression in said base portion is a U-shaped trough that is configured to support a base valve assembly positioned in said second end of said damper tube.

14. The damper as set forth in claim 10, wherein said base portion perimeter has an oval or rectangular shape and wherein said damper tube has a cylindrical shape that transitions to a non-circular opening at said second end that mates with said base portion of said monolithic base.

15. The damper as set forth in claim 1, wherein said monolithic base includes a pair of integrally formed fastening eyes in said opposing sides of said wall portion and a bushing assembly that is positioned in and supported by said pair of integrally formed fastening eyes to create an attachment loop at said second end of said damper tube.

16. A monolithic base for closing one end of a damper, said monolithic base comprising:
   a base portion defining a closed end of the monolithic base;
   a wall portion defining an open end of the monolithic base;
   said base portion including a concave depression that tapers inwardly from a base portion perimeter to a cup bottom;
   said concave depression extending in a first longitudinal direction relative to said base portion perimeter to define a depth of said concave depression;
   said wall portion extending in said first longitudinal direction from said base portion perimeter to said open end such that said cup bottom is positioned between opposing sides of said wall portion; and
   a pair of integrally formed fastening eyes in said opposing sides of said wall portion.

17. The monolithic base as set forth in claim 16, further comprising:
   an uninterrupted cavity, positioned laterally between said opposing sides of said wall portion, that extends longitudinally between said base portion and said open end.

18. The monolithic base as set forth in claim 17, wherein said wall portion has a tubular shape that extends from said base portion perimeter to said open end.

19. The monolithic base as set forth in claim 17, wherein said opposing sides of said wall portion form a clevis.

20. A method of manufacturing a damper, the method comprising the steps of:
   deep drawing a flat sheet metal blank into a tube to form a monolithic base having a base portion defined by a closed end of the tube, an open end opposite the closed end of the tube, and a wall portion of tubular shape that extends longitudinally from the base portion to the open end;
   deforming the base portion of the monolithic base to create a concave depression that tapers inwardly from a base portion perimeter to a cup bottom such that the cup bottom is positioned between opposing sides of the wall portion;
   partially flattening the opposing sides of the wall portion to create flat areas on the opposing sides of the wall portion and a sloped region positioned longitudinally between the base portion perimeter and the flat areas;
   punching a pair of integrally formed fastening eyes into the flat areas on the opposing sides of the wall portion to create an attachment loop; and
   attaching the base portion of the monolithic base to one end of a damper tube to close that end of the damper tube.

* * * * *